A. SMITH.
AUTOMATIC RELIEF-VALVES FOR CASKS.
No. 187,563. Patented Feb. 20, 1877.
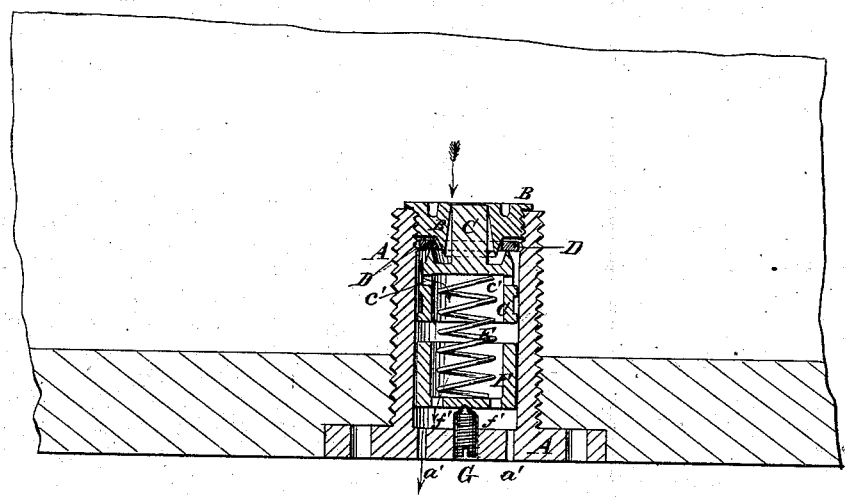
WITNESSES:
INVENTOR:
ATTORNEYS.

UNITED STATES PATENT OFFICE.

ADDISON SMITH, OF NEW YORK, N. Y.

IMPROVEMENT IN AUTOMATIC RELIEF-VALVES FOR CASKS.

Specification forming part of Letters Patent No. 187,563, dated February 20, 1877; application filed January 29, 1877.

*To all whom it may concern:*

Be it known that I, ADDISON SMITH, of the city, county, and State of New York, have invented a new and useful Improvement in Automatic Relief-Valves for Casks, of which the following is a specification:

The figure is a longitudinal section of my improved valve.

The object of this invention is to furnish an improved valve designed especially for casks containing beer and other fermenting liquids, but which may be used for other purposes, which shall be so constructed as to open and allow the inclosed gas to escape when the outward pressure rises above a certain point, and which shall be simple in construction and easily adjusted to resist any desired pressure before opening.

The invention consists in the hollow screw-plug having holes formed through its closed end, the screw-plug having a tapering hole formed through it, the hollow valve having its forward part made smaller, and holes formed through it, the packing, the spiral spring, the hollow follower having holes formed through it, and the screw, in combination with each other, as hereinafter fully described.

A is a hollow screw-plug, which is screwed into the head of the cask. The outer end of the plug A is closed, and has a ring-flange formed around it to fit into a countersink formed in the said head of the cask. The inner end of the hollow plug A is closed by a screw-plug, B. Through the center of the small plug B is formed a slightly-tapering hole to receive the stem of the valve C. The inner end of the plug B is rabbeted around its outer edge to receive the packing D, and the head of the valve C has a V-bead formed upon it to press against the packing D, and thus make a close joint. The head of the valve C is made hollow, or has a chamber or recess formed in it to receive the end of the coiled spring E, the other end of which rests in a recess or chamber formed in the follower F. The follower F is pressed forward to cause the spring E to hold the valve C to its seat with any desired force by a screw, G, that passes in through a screw-hole in the closed end of the plug A, and presses against the said follower F. The forward part of the head of the valve C is made a little smaller than the inner diameter of the plug A, and from said smaller part holes $c'$ lead into the chamber of said valve. In the end of the follower F are formed small holes $f'$, and in the closed end of the plug A are formed small holes $a'$.

With this construction, when the pressure rises above the point for which the spring E is set, the gas presses the valve C back, passes through the holes $c'$ into the cavity of the said valve, through the holes $f'$ in the follower F, and out through the holes $a'$ in the end of the plug A. As soon as the pressure is reduced to the point to which the valve is set, the spring E forces the valve C back to its seat, and stops the escape of the gas.

Having thus described my invention, I claim as new and desire to secure by Letters Patent—

The hollow screw-plug A, having holes $a'$ formed through its closed end, the screw-plug B having a tapering hole formed through it, the hollow valve C having its forward part made smaller, and holes $c'$ formed through it, the packing D, the spiral spring E, the hollow follower F having the holes $f'$ formed through it, and the screw G, in combination with each other, substantially as herein shown and described.

ADDISON SMITH.

Witnesses:
JAMES T. GRAHAM,
C. SEDGWICK.